Patented Feb. 19, 1924.

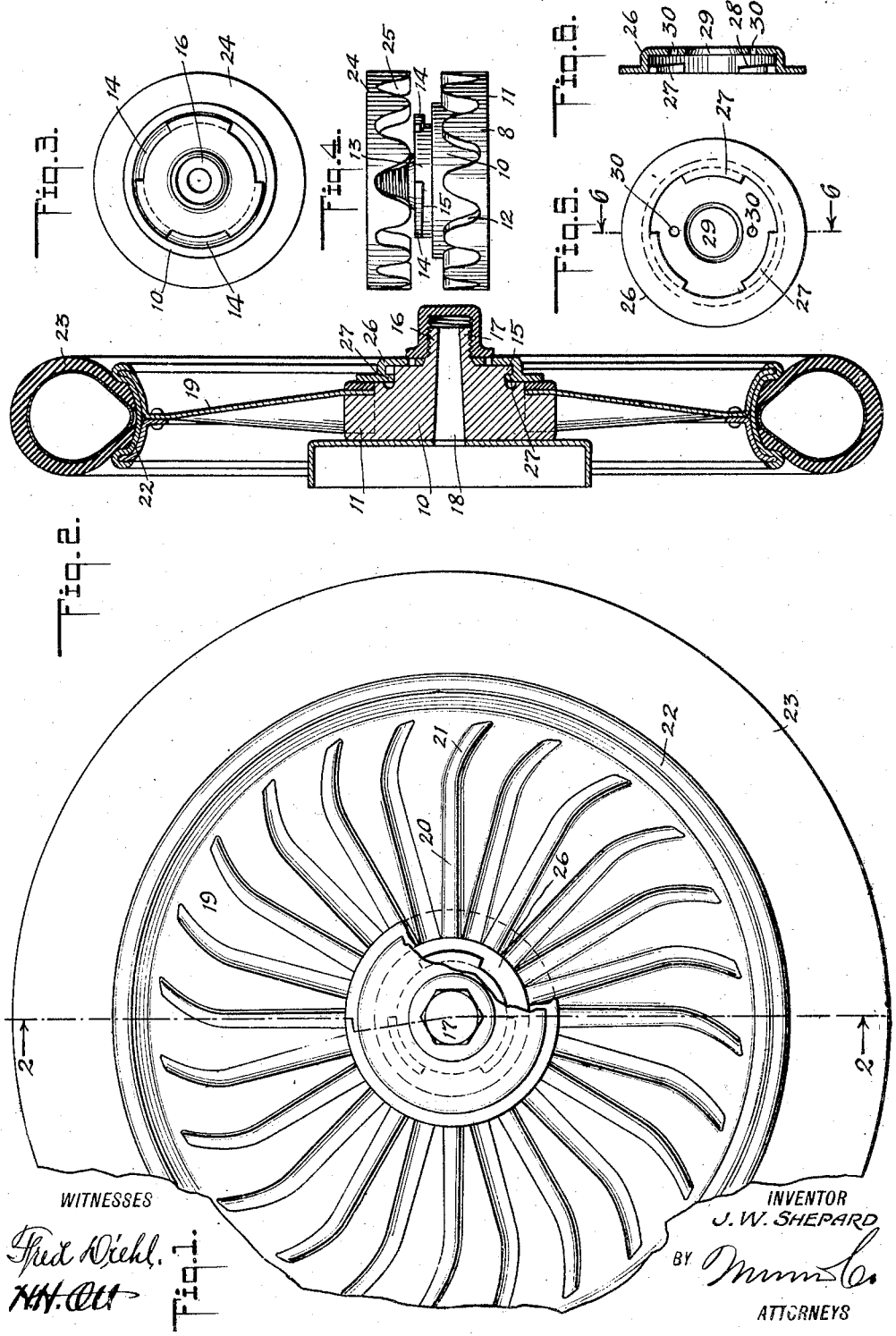

1,484,535

UNITED STATES PATENT OFFICE.

JOHN W. SHEPARD, OF TUCSON, ARIZONA.

VEHICLE WHEEL.

Application filed January 18, 1923. Serial No. 613,464.

*To all whom it may concern:*

Be it known that I, JOHN W. SHEPARD, a citizen of the United States, and a resident of Tucson, in the county of Pima and State of Arizona, have invented a new and Improved Vehicle Wheel, of which the following is a full, clear, and exact description.

This invention has relation to vehicle wheels and has particular reference to an improvement in automobile wheels of the disk type.

One of the principal objects of the present invention is to provide a disk wheel in which the disk which constitutes the element for supporting the tire supporting rim from the hub is detachably associated with the hub whereby the same may be readily associated or disassociated therewith when desired.

As a further object the invention contemplates in a disk for supporting a rim and tire from a hub means incorporated in said disk for lending a limited amount of flexibility thereto whereby vibration occasioned by excessive weight, jar, or jolt, will be partially absorbed and whereby expansion or contraction due to excessive heat or cold is compensated for.

As a further object the invention contemplates a disk wheel for vehicles which is extremely simple in its construction, inexpensive to manufacture and which is thoroughly reliable and highly efficient in its purpose.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1 is a side view of a wheel constructed in accordance with the invention, parts being broken away to disclose the underlying structure.

Fig. 2 is a transverse sectional view therethrough taken approximately on the line 2—2 of Fig. 1.

Fig. 3 is a side view of the hub and washer with the disk removed.

Fig. 4 is a collective side view of the hub and washer in juxtaposition.

Fig. 5 is an inner side view of the washer clamping member.

Fig. 6 is a sectional view therethrough taken approximately on the line 6—6 of Fig. 5.

Referring to the drawing by characters of reference, 10 designates the hub of the wheel which is provided adjacent one end with an enlarged circumferential shoulder 11, the inner face of which is provided with radial corrugations 12. At the opposite end the hub is provided with a reduced extension 13 having circumferentially spaced radially projecting lugs 14, the inner sides of which are circumferentially beveled as at 15. A further reduced exteriorly threaded extension 16 projects from the extension 13 to receive the usual dust cap 17. The hub and its extensions are provided with a central transverse opening 18 for the reception of the axle extremities. A disk 19 having a central aperture of a diameter to snugly fit the main body portion 10 of the hub is provided and said disk is provided with corrugations 20 which extend radially from the centrally apertured portion to a point adjacent the outer periphery of the disk. The outer extremities of the corrugations are circumferentially curved as at 21 in one direction whereby to lend a sufficient flexibility to the disk to absorb excessive weight, jars or jolts, and whereby to compensate for expansion and contraction due to radical changes in the temperature. The outer periphery of the disk is provided with a suitable rim 22 for the accommodation of a tire 23. The inner corrugated periphery of the disk adjacent the central aperture conforms to the corrugations 12 of the annular shoulder 11 whereby the same will snugly fit therein. A washer 24 having corrugations 25 on its inner side face is adapted to fit against the opposite side of the inner periphery of the disk and over the main body portion 10 of the hub. In order to provide means for impinging and retaining the washer 24 against the disk and the disk in turn against the corrugated inner face of the shoulder 11, a clamping member 26 is provided, which member is substantially cup shaped and is formed with inwardly projecting circumferentially spaced lugs 27, the outer side faces of which lugs are provided with a complementary bevel 28 which upon partial rotation of the member 26 interengage with the circumferentially beveled inner faces of the lugs 14. The member 26 is centrally apertured as at 29 to fit over the threaded extension 16 and to allow the same to project therebeyond. The member 26 is further provided with diametrically positioned openings 30 for receiving a spanner wrench to turn the same. The pitch of the threads of the dust cap are reverse to the inclination or bevel of the lugs 15 and 27 whereby the dust cap serves in the capacity of a jamb or lock nut for the clamping member 26.

In applying the disk to the hub, the inner apertured and corrugated periphery is positioned against the corrugated inner face of the shoulder 11; the inner corrugated side face 25 of the washer 24 is next applied against the opposite side of the disk; the clamping member 26 is applied over the extension 13 with the beveled lugs 27 therein interengaged with the beveled lugs 14 of the extension and finally the dust cap 17 is threaded on the reduced threaded extension 16. It will thus be seen that a vehicle wheel is provided in which a disk supporting element for the rim and tire is detachably associated with the hub whereby the removal or application of the same therefrom is greatly facilitated.

I claim:

1. In a vehicle wheel, a connection between the hub and rim consisting of a disk having radially disposed corrugations, the outer terminals of which are circumferentially curved.

2. In a vehicle wheel including a hub, a rim, means for supporting the rim from the hub comprising a disk having a central opening fitting over the hub and connected at its outer periphery to the rim, said disk having radial corrugations, the outer terminals of which are circumferentially curved.

3. In a vehicle wheel including a hub, a rim, means for supporting the rim from the hub comprising a disk having a central opening fitting over the hub and connected at its outer periphery to the rim, said disk having radial corrugations, the outer terminals of which are circumferentially curved, and complementary interengageable means on the hub for clamping the inner corrugated periphery of the disk therebetween whereby to detachably associate the disk with the hub.

4. In a vehicle wheel, a hub having a radially corrugated shoulder at one end, a disk having a tire supporting rim at its outer periphery and provided with a centrally apertured portion adapted to fit over the hub, corrugations extending radially from the apertured portion adapted to fit against the corrugated shoulder, a radially corrugated washer adapted to fit over the hub against the opposite side of the disk, and a plurality of beveled lugs extending radially from the hub at the opposite end from the shoulder, a clamping member having complementary beveled lugs adapted to engage the hub lugs for impinging the washer against the disk and for locking the same against displacement.

5. In a vehicle wheel, a hub having a radially corrugated shoulder at one end, a disk having a tire supporting rim at its outer periphery and provided with a centrally apertured portion adapted to fit over the hub, corrugations extending radially from the apertured portion adapted to fit against the corrugated shoulder, a radially corrugated washer adapted to fit over the hub against the opposite side of the disk, and a plurality of beveled lugs extending radially from the hub at the opposite end from the shoulder, a clamping member having complementary beveled lugs adapted to engage the hub lugs for impinging the washer against the disk and for locking the same against displacement, an exteriorly threaded extension from said end of the hub and a cap threadedly engaged thereover for locking the clamping member against displacement, the threads of said cap having a reverse pitch to the inclination of the beveled lugs.

JOHN W. SHEPARD.